United States Patent [19]

Kranz et al.

[11] Patent Number: 4,956,018
[45] Date of Patent: Sep. 11, 1990

[54] PREPARATION OF STRONG AND SOFT-TEXTURED SURFACE COATING PIGMENTS

[75] Inventors: Joachim Kranz, Ludwigshafen; Alois Wiesenberger, Lambsheim, both of Fed. Rep. of Germany

[73] Assignee: BASF Aktiengesellschaft, Ludwigshafen, Fed. Rep. of Germany

[21] Appl. No.: 279,097

[22] Filed: Dec. 2, 1988

[30] Foreign Application Priority Data

Dec. 3, 1987 [DE] Fed. Rep. of Germany ....... 3740977

[51] Int. Cl.$^5$ .................. C04B 14/00; C09B 67/50; C08K 5/00
[52] U.S. Cl. .................................. 106/401; 106/412; 106/413; 106/499; 106/505
[58] Field of Search ............... 106/400, 401, 412, 413, 106/499, 505

[56] References Cited

U.S. PATENT DOCUMENTS

| | | | |
|---|---|---|---|
| 2,556,728 | 6/1951 | Graham et al. | 540/141 |
| 2,645,643 | 7/1953 | Gottlieb et al. | 540/141 |
| 2,791,589 | 5/1957 | Pugin et al. | 540/141 |
| 4,522,654 | 6/1985 | Chisvette et al. | 106/412 |
| 4,853,039 | 8/1989 | Donegan et al. | 106/413 |

FOREIGN PATENT DOCUMENTS

685582 1/1953 United Kingdom .

OTHER PUBLICATIONS

Grant and Hackh's *Chemical Dictionary*, McGraw-Hill, 1987, p. 24.

*Primary Examiner*—Deborah Yee
*Attorney, Agent, or Firm*—Oblon, Spivak, McClelland, Maier & Neustadt

[57] ABSTRACT

Grinding crude pigments together with inorganic grinding aids, for example rock salt and dialkyl phthalates, phenoxyethanol, 2-phenylethanol and/or dialkyl benzoates gives soft-textured pigments which produce strong colorings of higher transparency and/or higher cleanliness of hue than prior art pigments.

9 Claims, No Drawings

PREPARATION OF STRONG AND SOFT-TEXTURED SURFACE COATING PIGMENTS

Colored organic pigments in the crude form are generally unsuitable for use. For instance, crude copper phthalocyanines are obtained in the form of needles from 10 to 100 μm in length, depending on the method of synthesis, which then need to be conditioned to convert them into a coloristically and practically useful crystal form. Besides acid pasting with concentrated sulfuric acid, one of the oldest methods of conditioning, still used today, is salt grinding. In salt grinding, the coarse particles are ground in ball mills in the presence of several times the amount of rock salt and are thus formed into compact and isometric pigment particles. Only in the latter stage are the best coloristic properties obtained. In the process of salt grinding, grinding aids have a crystallizing effect, in particular in the presence of aromatic liquids. These liquids control crystal size and shape and, in addition, convert the comparatively high-energy crystal modifications formed under the high mechanical stress back into lower-energy forms to a partial or complete extent. For instance in the case of copper phthalocyanine depending on the version of the process, it is possible to obtain pure alpha and beta copper phthalocyanines or, alternatively, mixtures thereof in a specific manner.

For safety reasons, these liquids must have a very high ignition temperature, as possessed by chlorinated benzenes, for example o-dichlorobenzene at 640° C. or 1,2,4-trichlorobenzene at 570° C.

These halobenzenes, however, have a number of disadvantages: they have a strong smell; they are steam volatile, causing a nuisance during the workup; as aromatics they have strong affinity for the organophilic pigment, so that the pigment still contains a certain amount of these agents even after workup; and, and this is particularly serious, they are slow to degrade in wastewater, so that a separate waste disposal step is required for wastewater. For instance, beta copper phthalocyanine pigments prepared by the salt grinding process in the presence of trichlorobenzene contain up to 0.7% by weight of the chlorocarbon. Aromatic chlorocarbons present in the pigment can have an interfering effect in the production of surface coatings.

It is an object of the present invention to provide further aids suitable for the salt grinding process which do not have the disadvantages of prior art aids.

We have found that this object is achieved when the prior art aromatic chlorocarbon aids are replaced by those according to the invention. Accordingly, the present invention provides a process for preparing a strong and soft-textured surface coating pigment by grinding the crude pigment together with an inorganic grinding aid in the presence of an organic liquid in a ball mill or a corresponding comminutor, which comprises grinding in the presence of a dialkyl phthalate, phenoxyethanol, 2-phenylethanol, a $C_1$–$C_4$-alkyl benzoate or a mixture thereof as the organic liquid.

The aids to be used according to the invention have high ignition temperatures, for example phenylethanol at 410° C., dimethyl phthalate at 470° C., dibutyl phthalate at 390° C., diisobutyl phthalate at 425° C., methyl benzoate at 518° C. and 2-phenoxyethanol at 535° C.

The process gives a strong and readily dispersible surface coating pigment.

Suitable dialkyl phthalates are preferably those of $C_1$–$C_{15}$-alkanols and -alkoxyalkanols, in particular of $C_1$–$C_8$-alkanols and -alkoxyalkanols. Specific examples of alkyl radicals are: methyl, ethyl, butyl, isobutyl, 2-ethylhexyl, octyl, nonyl, decyl, isodecyl, isotridecyl, methoxyethyl, ethoxyethyl and butoxyethyl.

Particular preference is given to dimethyl phthalate.

Of $C_1$–$C_4$-alkyl benzoates, methyl benzoate is preferred on economic grounds.

Suitable crude pigments are those which are prepared in the prior art by salt grinding in the presence of chlorinated aromatic liquids.

Suitable starting crude pigments are for example: copper phthalocyanines, which may contain up to 6% by weight of chlorine and possibly in addition up to 1% by weight of sulfur in the form of sulfo groups, and polycyclic compounds, such as flavanthrone, pyranthrone and indanthrone.

The process of salt grinding is carried out in a conventional manner, except that the organic liquid used is one of those mentioned. The amount of liquid according to the invention is not less than 0.5% by weight, based on the crude pigment. The upper limit is 20% by weight. Advantageously, from 1 to 10% by weight, based on the crude pigment, of said liquid is employed. The most suitable amount of organic liquid depends on the crude pigment and is readily ascertainable by performing grinding tests. To this end, the pigments obtained are tested coloristically in a surface coating in respect of color strength (dispersibility), the cleanliness of hue of the coloring, and gloss.

The process will be additionally explained by the working examples that follow. Parts and percentages are by weight.

EXAMPLE 1

15 parts of crude copper phthalocyanine (chlorine content: 2.7%) were ground with 120 parts of sodium chloride and 1.5 parts of dimethyl phthalate in a 750 ml steel pot of a laboratory vibratory mill, packed with 1500 parts of steel balls (20 mm in diameter), at from 100° to 110° C. for about 30 hours. The mill base is added to 800 parts of hot water at 70° C. containing 10 parts of concentrated hydrochloric acid, and the suspension is stirred. The pigment is filtered off with suction, washed until ion-free and dried.

Yield: 14.5 parts of copper phthalocyanine pigment which is highly suitable for pigmenting surface coatings. The pigment is somewhat more transparent and soft-textured than the pigment of Comparative Example 1 (=prior art).

COMPARATIVE EXAMPLE 1

Example 1 was repeated, except that the dimethyl phthalate was replaced by the same amount of trichlorobenzene. A blue pigment was obtained which had the same coloristic properties but which, compared with the pigment of Example 1, was somewhat less transparent and somewhat harsher in texture.

EXAMPLES 2 AND 3

Example 1 was repeated, except that the dimethyl phthalate was replaced by di-n-butyl phthalate (Example 2) and by diisobutyl phthalate (Example 3) respectively. The surface coating pigments obtained had virtually the same coloristic properties as the pigment obtained in Example 1.

EXAMPLE 4

20 parts of a crude copper phthalocyanine (chlorine content about 4.5%) which also contained 0.4% of sulfur in the molecule in the form of sulfo groups were ground together with 160 parts of sodium chloride and 2 parts of diethyl phthalate in the mill described in Example 1 at about 100° C. for 40 hours. Removing the salt in a conventional manner left 19.5 parts of a surface coating pigment which, compared with the prior art pigment (=Comparative Example 2), is a little weaker in color but is less harsh in texture and more transparent.

COMPARATIVE EXAMPLE 2

20 parts of the crude copper phthalocyanine (4.5% of chlorine) used in Example 4, which additionally contain 0.4% of sulfur in the molecule in the form of sulfo groups, were ground together with 160 parts of sodium chloride and 2 parts of o-dichlorobenzene in the mill described in Example 1 at about 100° C. for 40 hours. Removal of the salt in a conventional manner left 19.5 parts of a surface coating pigment.

EXAMPLES 5 TO 9

Example 4 was repeated, except that the diethyl phthalate was replaced by the same amount of one of the following esters:
Example 5: dimethyl phthalate
Example 6: di-2-ethylhexyl phthalate
Example 7: diisodecyl phthalate
Example 8: dimethoxyethyl phthalate.

The surface coating pigments obtained have virtually the same coloristic properties as the pigment obtained in Example 4. The pigments conform to the pigment of Example 4 in color strength, dispersibility and transparency.

EXAMPLE 9

The vibratory mill described in Example 1 was used to grind 20 parts of flavanthrone, 120 parts of sodium chloride and 0.4 part of dimethyl phthalate at about 75° C. for 36 hours. A customary workup gave 19.5 parts of a soft-textured yellow surface coating pigment which gives colorings of higher color strength and a higher cleanliness of hue than the pigment of Comparative Example 3 (prior art).

COMPARATIVE EXAMPLE 3

Example 9 was repeated, except that the dimethyl phthalate was replaced by 0.4 part of trichlorobenzene. The workup gave a yellow pigment which, compared with the pigments obtainable in Examples 9 and 14, gave colorings of distinctly lower color strength and saturation.

EXAMPLE 10

15 parts of crude copper phthalocyanine (chlorine content about 2.7%) were ground together with 120 parts of sodium chloride and 1.5 parts of 2-phenoxyethanol in a 750 ml steel pot filled with 1,500 parts of steel balls (~20 mm in diameter) at 110° C. for 30 hours. The mill base was desalted in 800 parts of hot water at 70° C. containing 10 parts of concentrated hydrochloric acid, and the pigment was filtered off with suction, washed with water until ion-free and dried. A surface coating pigment is obtained which, compared with the prior art pigment (=Comparative Example 1), gives colorings which are a little stronger and cleaner.

EXAMPLES 11 AND 12

Example 10 was repeated, except that the 2-phenoxyethanol was replaced by the same amount of methyl benzoate (Example 11) and phenylethanol (Example 12) respectively. Working up gives blue pigments which have the same coloristic properties as the pigment obtained in Example 10.

EXAMPLE 13

9 parts of a crude copper phthalocyanine containing 4.5% of chlorine and additionally 0.4% of sulfur in the molecule in the form of sulfo groups were ground together with 72 parts of sodium chloride and 0.9 part of phenoxyethanol in the mill described in Example 1 at 100° C. for 24 hours. The salt was removed in a conventional manner to leave 19.5 parts of a surface coating pigment which, compared with the prior art pigment (=Comparative Example 2), gave somewhat stronger and more transparent colorings.

EXAMPLE 14

The vibratory mill described in Example 10 was used to grind 20 parts of flavanthrone, 120 parts of sodium chloride and 0.2 part of phenoxyethanol at 75° C. for 36 hours. A customary workup left 19.5 parts of a yellow surface coating pigment which gave colorings of distinctly higher color strength and saturation than the pigment of Comparative Example 3.

We claim:

1. In a process for preparing a strong and soft-textured surface coating pigment by grinding the crude pigment together with an inorganic grinding aid in the presence of an organic liquid in a comminutor, the improvement comprising grinding in the presence of a phthalic diester of a $C_1$–$C_{15}$-alkanol or an alkoxyalkanol of from 3 to 15 carbon atoms in total, phenoxyethanol, 2-phenylethanol, a $C_1$–$C_4$-alkyl benzoate or a mixture thereof as the organic liquid.

2. A process as claimed in claim 1, wherein grinding takes place in the presence of a phthalic diester of a $C_1$–$C_8$-alkanol or of an alkoxyalkanol of from 3 to 8 carbon atoms in total.

3. A process as claimed in claim 1, wherein grinding takes place in the presence of dimethyl phthalate.

4. A process as claimed in claim 1, wherein from 0.5 to 20% by weight of organic liquid is used based on the crude pigment.

5. A process as claimed in claim 2, wherein from 0.5 to 20% by weight of organic liquid is used based on the crude pigment.

6. A process as claimed in claim 3, wherein from 0.5 to 20% by weight of organic liquid is used based on the crude pigment.

7. A process as claimed in claim 1, wherein from 1 to 10% by weight of liquid is used.

8. A process as claimed in claim 2, wherein from 1 to 10% by weight of liquid is used.

9. A process as claimed in claim 3, wherein from 1 to 10% by weight of liquid is used.

* * * * *